(12) United States Patent
Shen et al.

(10) Patent No.: US 10,312,974 B2
(45) Date of Patent: Jun. 4, 2019

(54) MIMO TRANSMISSION SCHEME USING MULTIPLE ANTENNAS IN A RADIO COMMUNICATION STATION

(71) Applicant: NTT DOCOMO, INC., Tokyo (JP)

(72) Inventors: Jiyun Shen, Tokyo (JP); Satoshi Suyama, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 49 days.

(21) Appl. No.: 15/508,448

(22) PCT Filed: Sep. 2, 2015

(86) PCT No.: PCT/JP2015/074981
§ 371 (c)(1),
(2) Date: Mar. 2, 2017

(87) PCT Pub. No.: WO2016/035828
PCT Pub. Date: Mar. 10, 2016

(65) Prior Publication Data
US 2017/0294943 A1    Oct. 12, 2017

(30) Foreign Application Priority Data
Sep. 3, 2014    (JP) .................................. 2014-179444

(51) Int. Cl.
*H04B 7/208*    (2006.01)
*H04B 7/0413*    (2017.01)
(Continued)

(52) U.S. Cl.
CPC ........... *H04B 7/0413* (2013.01); *H04B 7/043* (2013.01); *H04B 7/06* (2013.01); *H04B 7/0617* (2013.01);
(Continued)

(58) Field of Classification Search
CPC ........... H04B 7/0413; H04B 7/06; H04B 7/10
See application file for complete search history.

(56) References Cited

U.S. PATENT DOCUMENTS

2012/0163439 A1*   6/2012  Zhou .................... H04B 7/0417
                                            375/224
2012/0213144 A1*   8/2012  Zhang ................... H04B 7/024
                                            370/312
(Continued)

FOREIGN PATENT DOCUMENTS

JP    2007-104547 A    4/2007
JP    2010-283480 A    12/2010
(Continued)

OTHER PUBLICATIONS

English translation of "Shen, Jiyun et al.; "PAPR Reduction Method by Average Signal Power Compensation for Super High Bit Rate Massive MIMO OFDM Transmissions Using Higher Frequency Bands"; Proceedings of the 2014 IEICE Communications Society Conference 1, Sep. 9, 2014, pp. 335, B-5-64", previously cited on a SB08 dated Mar. 2, 2017 (3 pages).
(Continued)

*Primary Examiner* — Abdelnabi O Musa
(74) *Attorney, Agent, or Firm* — Osha Liang LLP

(57) ABSTRACT

A radio transmitting station includes: multiple transmitting antenna elements configured to transform electrical signals into radio waves and emit the radio waves; a precoder configured to control a beam direction of the radio waves to be emitted from the multiple transmitting antenna elements by giving precoding weights to the electrical signals to be supplied to the multiple transmitting antenna elements; and at least one power adjuster configured to adjust power of an electrical signal that is to be supplied to at least a portion of the multiple transmitting antenna elements, such that differ-
(Continued)

ences between powers of the electrical signals to be supplied to the multiple transmitting antenna elements are reduced.

19 Claims, 11 Drawing Sheets

(51) Int. Cl.
    *H04B 7/06*     (2006.01)
    *H04B 7/10*     (2017.01)
    *H04W 16/28*     (2009.01)
    *H04B 7/0426*     (2017.01)

(52) U.S. Cl.
    CPC .............. *H04B 7/10* (2013.01); *H04W 16/28* (2013.01); *Y02D 70/00* (2018.01)

(56) References Cited

U.S. PATENT DOCUMENTS

| | | | | |
|---|---|---|---|---|
| 2013/0171997 | A1* | 7/2013 | Zasowski | H04W 84/042 455/446 |
| 2013/0230013 | A1* | 9/2013 | Seo | H04L 27/2602 370/329 |
| 2015/0146650 | A1* | 5/2015 | Ko | H04B 7/0456 370/329 |
| 2015/0372737 | A1* | 12/2015 | Park | H04W 16/28 370/329 |
| 2017/0163317 | A1* | 6/2017 | Kim | H04B 7/0408 |
| 2018/0069608 | A1* | 3/2018 | Nishimoto | H04B 7/04 |

FOREIGN PATENT DOCUMENTS

| | | |
|---|---|---|
| JP | 2011-259140 A | 12/2011 |
| JP | 2013-531412 A | 8/2013 |
| JP | 2013-232741 A | 11/2013 |
| WO | 2011/140507 A1 | 11/2011 |

OTHER PUBLICATIONS

International Search Report issued in PCT/JP2015/074981 dated Oct. 6, 2015 (2 pages).
Shen, Jiyun et al.; "PAPR Reduction Method by Average Signal Power Compensation for Super High Bit Rate Massive MIMO OFDM Transmissions Using Higher Frequency Bands"; Proceedings of the 2014 IEICE Communications Society Conference 1, Sep. 9, 2014, pp. 335, B-5-64 (2 pages).

\* cited by examiner

MIMO TRANSMISSION SCHEME USING MULTIPLE ANTENNAS IN A RADIO COMMUNICATION STATION

TECHNICAL FIELD

The present invention relates to a radio transmitting station.

BACKGROUND ART

In the field of radio communications, a MIMO (Multiple-Input and Multiple-Output) transmission scheme is being utilized, which realizes improvement in the speed and quality of signal transmission by performing transmission and reception by use of multiple antennas in both the radio transmitting station and the radio receiving station.

In order to further increase the speed and reduce interference in signal transmission, the use of a massive MIMO transmission scheme, which uses a large number of antenna elements (e.g., 100 or more elements), is being considered in a high frequency band (e.g., at 10 GHz or higher) in which reductions in sizes of antennas and securing of wide bandwidths are possible (see, for example, Patent Document 1). For example, the use of the massive MIMO transmission scheme is being considered for the mobile communication system supporting UMTS (Universal Mobile Telecommunications System) LTE-A and subsequently developed systems.

In massive MIMO, advanced precoding using a larger number of antenna elements can be performed, compared with conventional MIMO. In this specification, precoding is a technique of adjusting, by giving weights (weight coefficients) to electrical signals that are to be supplied to the antenna elements, the phases and amplitudes of the electrical signals to control the directions of radio-wave beams emitted from the antenna elements, in order to perform beamforming and to transmit multiple streams that are spatially separated. Beamforming is a technique of controlling the directivity and the shape of a beam by controlling multiple antenna elements. Since the phase and the amplitude can be controlled for each transmitting antenna element in MIMO, the flexibility of beam control improves with the number of antenna elements that are used. The weights for precoding (precoding weights) are selected on the basis of channel state information (CSI) on a transmission path between a radio transmitting station and a radio receiving station.

RELATED ART DOCUMENT

Patent Document

Patent document 1: Japanese Patent Application Laid-Open Publication No. 2013-232741

SUMMARY OF THE INVENTION

Problem to be Solved by the Invention

Since the radio transmitting station performs precoding for transmitting multiple streams in MIMO, as well as in massive MIMO, the powers of electrical signals that are to be supplied to certain transmitting antenna elements among the multiple transmitting antenna elements are much greater than the powers of electrical signals that are to be supplied to the other transmitting antenna elements. As a result of precoding being performed, the power of an electrical signal to be supplied to each transmitting antenna element is considered to depend on the arrangement of all the transmitting antenna elements, the precoding algorithm in use, the position of that transmitting antenna element, and the beam transmission direction.

Therefore, the peak-to-average power ratios (PAPRs) of signals are high in MIMO, particularly in massive MIMO. The PAPR here is the ratio of the maximum power supplied to a transmitting antenna element to the average of powers supplied to all the transmitting antenna elements. Generally speaking, in the radio transmitting station, the powers of the electrical signals that are to be supplied to transmitting antenna elements are amplified by corresponding power amplifiers. The power amplifiers each have a range in which the input-output linearity is maintained. When high power is supplied, nonlinear distortion occurs in the output signals, and the communication quality consequently deteriorates. Additionally, frequency components different from a desired frequency are generated as a result of the nonlinear distortion. Transmission of radio waves at such frequencies will increase interference with other equipment or other systems.

Heretofore, research has been made on methods for reducing the PAPR in OFDM (Orthogonal Frequency-Division Multiplexing). In OFDM, the PAPR is high because the powers for certain subcarriers are higher than the powers for the other subcarriers. In MIMO, however, the issue arises from that multiple electrical signals are synthesized in the same antenna, and thus, even if the methods for reducing the PAPR in OFDM are useful, their effectiveness will be limited.

In view of the above, the present invention provides a radio transmitting station in which differences between the powers of electrical signals to be supplied to multiple transmitting antenna elements are reduced.

Means of Solving the Problems

A radio transmitting station according to the present invention includes: multiple transmitting antenna elements configured to transform electrical signals into radio waves and emit the radio waves; a precoder configured to control a beam direction of the radio waves to be emitted from the multiple transmitting antenna elements by giving precoding weights to the electrical signals to be supplied to the multiple transmitting antenna elements; and at least one power adjuster configured to adjust power of an electrical signal that is to be supplied to at least a portion of the multiple transmitting antenna elements, such that differences between powers of the electrical signals to be supplied to the multiple transmitting antenna elements are reduced.

Effect of the Invention

According to the present invention, the differences between the powers of the electrical signals to be supplied to the multiple transmitting antenna elements are reduced. Therefore, even in a case where the powers of the electrical signals to be supplied to the transmitting antenna elements are amplified by power amplifiers, the nonlinear distortion in the signals output from the power amplifiers can be reduced.

MODES FOR CARRYING OUT THE INVENTION

Hereinafter, various embodiments of the present invention will be described with reference to the accompanying drawings.

Massive MIMO

A massive-MIMO transmission scheme according to embodiments of the present invention will be described. In massive MIMO, in which a large number of transmitting antennas are used to perform radio communication, a high radio communication speed (a high data rate) is achieved by multiplexing of many streams. Moreover, more advanced beamforming compared with conventional beamforming is achieved because the flexibility in antenna control in performing beamforming is improved. Accordingly, reduction in interference and efficient usage of radio resources are achieved. Non-limiting examples of the number of transmitting antennas provided for a radio transmitting station supporting massive MIMO include 32 antennas or more, 100 antennas or more, and 1000 antennas or more.

With massive MIMO, it is possible to effectively use a high frequency band (e.g., a frequency band at 10 GHz or higher). In a high frequency band, compared with a low frequency band, it is easier to secure radio resources with a wide bandwidth (e.g., 200 MHz or wider), which lead to high-speed communication. Moreover, since the size of a transmitting antenna is proportional to the wavelength of a signal, in a case where a high frequency band, in which radio signals have a short wavelength, is used, the size of a transmitting antenna can be further reduced. Since propagation loss increases as frequency becomes higher, even when the same transmission power is used by a base station to transmit a radio signal, the received signal strength at a mobile station will be lower in a case where a high frequency band is used, compared with a case where a low frequency band is used. However, this reduction in the received signal strength due to the use of a high frequency band can be compensated by a massive-MIMO beamforming gain.

Figure 1:
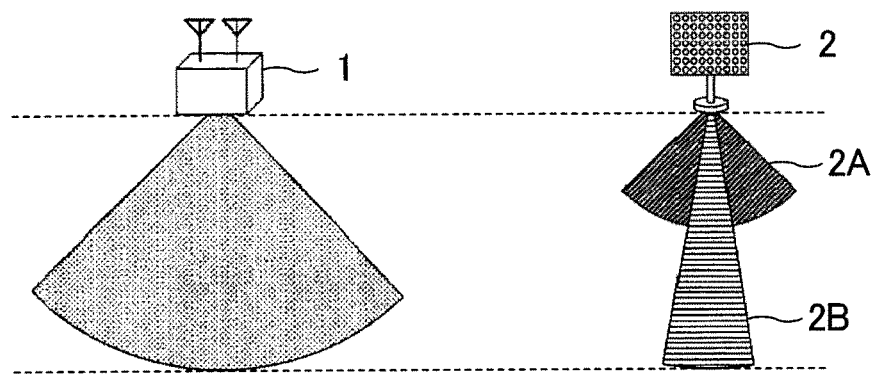
FIG. 1 is a diagram for illustrating an outline of massive MIMO.

FIG. 1 is a diagram schematically showing the reachable ranges of beams (radio signals) varying depending on frequencies. A conventional base station 1 (e.g., a macro cell base station) uses a low frequency band to perform radio communication, and accordingly, is able to extend a beam with a wide-width radiation pattern to a great distance without performing massive MIMO. A base station 2 that uses a high frequency band is unable to extend a beam 2A to a great distance when using a wide-width radiation pattern without performing massive MIMO. However, when emitting a beam 2B with a narrow-width radiation pattern with the use of massive-MIMO beamforming, the base station 2 is able to extend the beam 2B to a greater distance.

Figure 2:
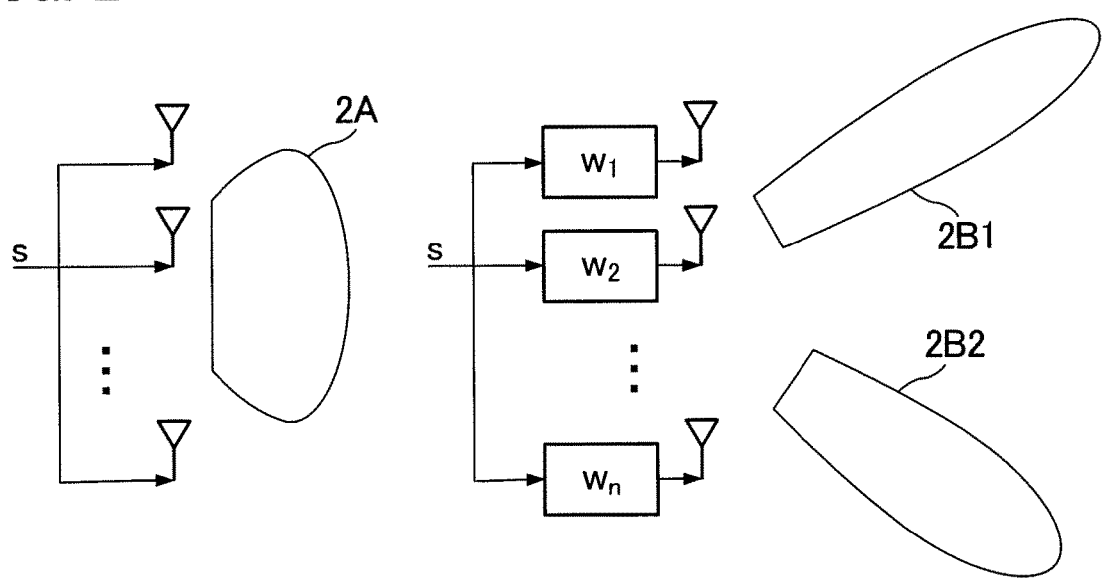
FIG. 2 is a diagram for illustrating an effect of beamforming with massive MIMO.

Beamforming is a technology that gives directivity to a radio-wave beam by controlling the amplitudes and phases of radio waves with respect to multiple antennas. As shown in FIG. 2, when a transmission signal s is simply supplied to each of the antennas, a beam 2A that is emitted from these antennas has a wide width and does not reach a great distance. By giving, to a transmission signal s supplied to each antenna, a respective one of appropriate precoding weights $w_1$ to $w_n$ (n being the number of antennas), one or more beams 2B1 and 2B2 with narrow widths are emitted from these antennas. The beams 2B1 and 2B2 reach a greater distance. It is possible to direct one or more transmission beams to each of multiple radio receiving stations using the same frequency simultaneously. With an increase in the number of antennas, the number of beams will increase, the width of the beams will be narrower, and more precise control over the directions of the beams will be attained. The narrower the width of the beams, the higher the gain that will be obtained (i.e., the higher the power with which a radio receiving station receives a signal will be).

Figure 3:
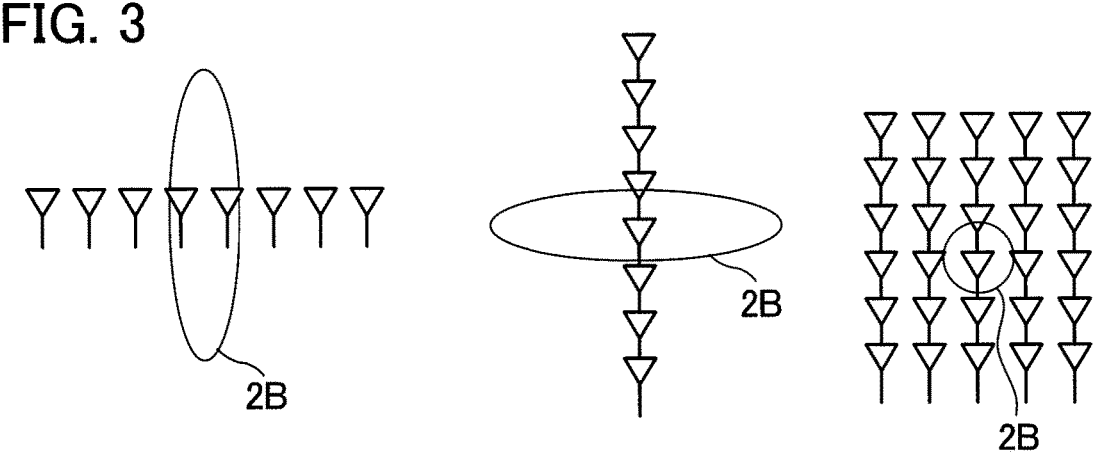
FIG. 3 is a diagram for illustrating shapes of beams formed by beamforming with massive MIMO.

As shown in FIG. 3, the shape of a beam 2B formed by beamforming is restricted by the antenna arrangement. FIG. 3 shows cross-sectional surfaces of beams 2B, the surfaces being parallel to the plane of the paper. Naturally, the shapes of the actual beams 2B are three-dimensional. When the antennas are arranged in a horizontal line, a beam 2B with a cross-section that is long in the vertical direction and is short in the horizontal direction is formed. When the antennas are arranged in a vertical line, a beam 2B with a cross-section that is long in the horizontal direction and is short in the vertical direction is formed. When the antennas are arranged in lines in the horizontal and vertical directions, a beam 2B with a cross-section that is narrow in the horizontal and vertical directions is formed.

Beamforming is used not only for forming a transmission beam in the radio transmitting station, but also for forming a reception beam by giving a weight to a signal received by a receiving antenna in the radio receiving station. Beamforming in the radio transmitting station is referred to as "transmission beamforming", and beamforming in the radio receiving station is referred to as "reception beamforming".

Heterogeneous Network

Figure 4:
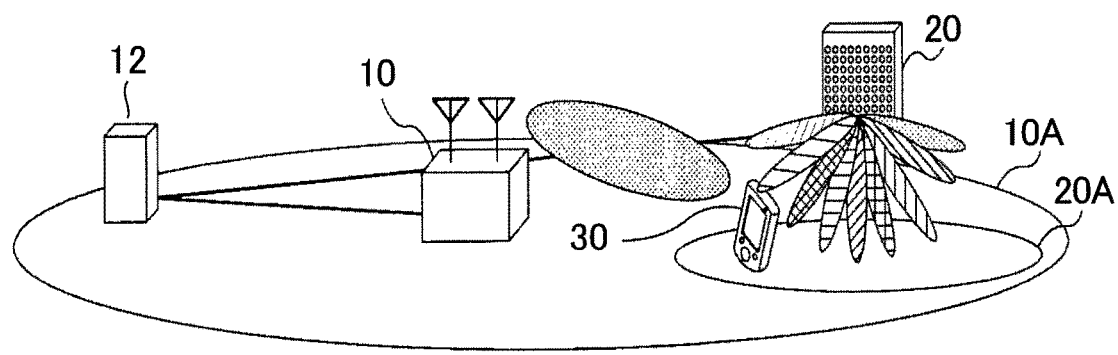
FIG. 4 is a schematic diagram illustrating a heterogeneous network in which a small cell base station using massive MIMO is arranged.

FIG. 4 shows an example disposition of a base station in which massive MIMO is used. A radio communication network shown in FIG. 4 includes a macro cell base station 10, a central control station (mobility management entity (MME)) 12, and a small cell base station 20. The macro cell base station 10 and the small cell base station 20 each communicate with a user device (mobile station or user equipment (UE)) 30. Although only a single user device 30 is depicted in FIG. 4, each base station communicates with many user devices 30.

Although the macro cell base station 10 does not utilize massive MIMO, the macro cell base station 10 uses a low frequency band (e.g., 2 GHz band), and thus, radio waves emitted from the macro cell base station 10 reach great distances. In FIG. 4, reference sign 10A indicates a macro cell area of the macro cell base station 10. Since the macro cell base station 10 has wide coverage, it has a stable connection with the user device 30.

The small cell base station 20 uses a high frequency band (e.g., 10 GHz band). Although the small cell base station 20 utilizes massive MIMO, the access range of radio waves emitted from the small cell base station 20 (a small cell area 20A of the small cell base station 20) is narrower than the macro cell area 10A. Accordingly, the small cell base station 20 and the user device 30 are likely to be connected by a line-of-sight connection, and in such a case, a radio channel between the small cell base station 20 and the user device 30 is likely to be of low frequency selectivity. The small cell base station 20 uses a wide bandwidth (e.g., 200 MHz or wider) and is suited for high-speed communication.

The small cell base station 20 is disposed such that the small cell area 20A overlaps with the macro cell area 10A. Having entered the small cell area 20A, the user device 30 communicates with the small cell base station 20. The small cell base station 20 will typically be disposed in a hotspot where many user devices 30 are present, and thus, large amounts of traffic are expected. Although FIG. 4 depicts only a single small cell base station 20, many small cell base stations 20 may be disposed in the macro cell area 10A. As described above, the depicted network is a heterogeneous network in which various types of base stations with varying coverage are present.

The user device 30 has a function of supporting multiple connectivity, which enables the user device 30 to communicate with multiple base stations simultaneously. Typically, after the user device 30 enters the small cell area 20A, the small cell base station 20 performs data communication with the user device 30 by taking advantage of high-speed communication resulting from the use of a wide bandwidth, whereas the macro cell base station 10 maintains the connection to the user device 30 to transmit a control signal to the user device 30 and to receive from the user device 30 a signal necessary for the user device 30 to connect to the small cell base station 20. In this case, the macro cell base station 10 serves to maintain connectivity of the user device 30 to the radio communication network and maintain mobility of the user device 30. In other words, the small cell base station 20 handles a user plane (U-plane) and the macro cell base station 10 handles a control plane (C-plane). In addition to communicating data with the user device 30, the small cell base station 20 may exchange with the user device 30 some control signals that are required for communicating data. The macro cell base station 10 and the small cell base station 20 share upper-level control information.

The macro cell base station 10 supplies to the small cell base station 20 information (side-information) that is required for the user device 30 that has entered the small cell area 20A to communicate with the small cell base station 20. Such a support by the macro cell base station 10 for communication between the user device 30 and the small cell base station 20 is described as "macro-assisted" or "network-assisted". In the example in FIG. 4, the small cell base station 20 and the macro cell base station 10 are each connected to a central control station 12, and the central control station 12 relays information between these two nodes. The small cell base station 20 and the macro cell base station 10 may be directly connected to each other.

In this network, OFDMA (Orthogonal Frequency Division Multiple Access) is used for the downlink radio communication, and SC-FDMA (Single Carrier-Frequency Division Multiple Access) is used for the uplink radio communication. The downlink radio communication performed by the small cell base station 20 benefits from multiplexing in OFDMA and also from spatial multiplexing in MIMO.

In the example shown in FIG. 4, the macro cell base station 10 and the small cell base station 20 use the same radio access technology (RAT). For example, the macro cell base station 10 and the small cell base station 20 may perform communication in compliance with LTE-A or subsequent 3GPP (Third Generation Partnership Project) standards. Alternatively, the macro cell base station 10 and the small cell base station 20 may use different RAT. For example, either the macro cell base station 10 or the small cell base station 20 may perform communication in compliance with wireless LAN standards, such as WiFi (registered trademark).

In the following, embodiments of the present invention will be described using an example in which the small cell base station 20 serves as a radio transmitting station and the user device 30 serves as a radio receiving station. It is noted that the radio transmitting station according to the present invention is not limited to the small cell base station 20. The radio transmitting station may be any other communication device that has a mechanism to control multiple transmitting antennas and to control directions of radio-wave beams emitted from these transmitting antennas.

First Embodiment

Figure 5:
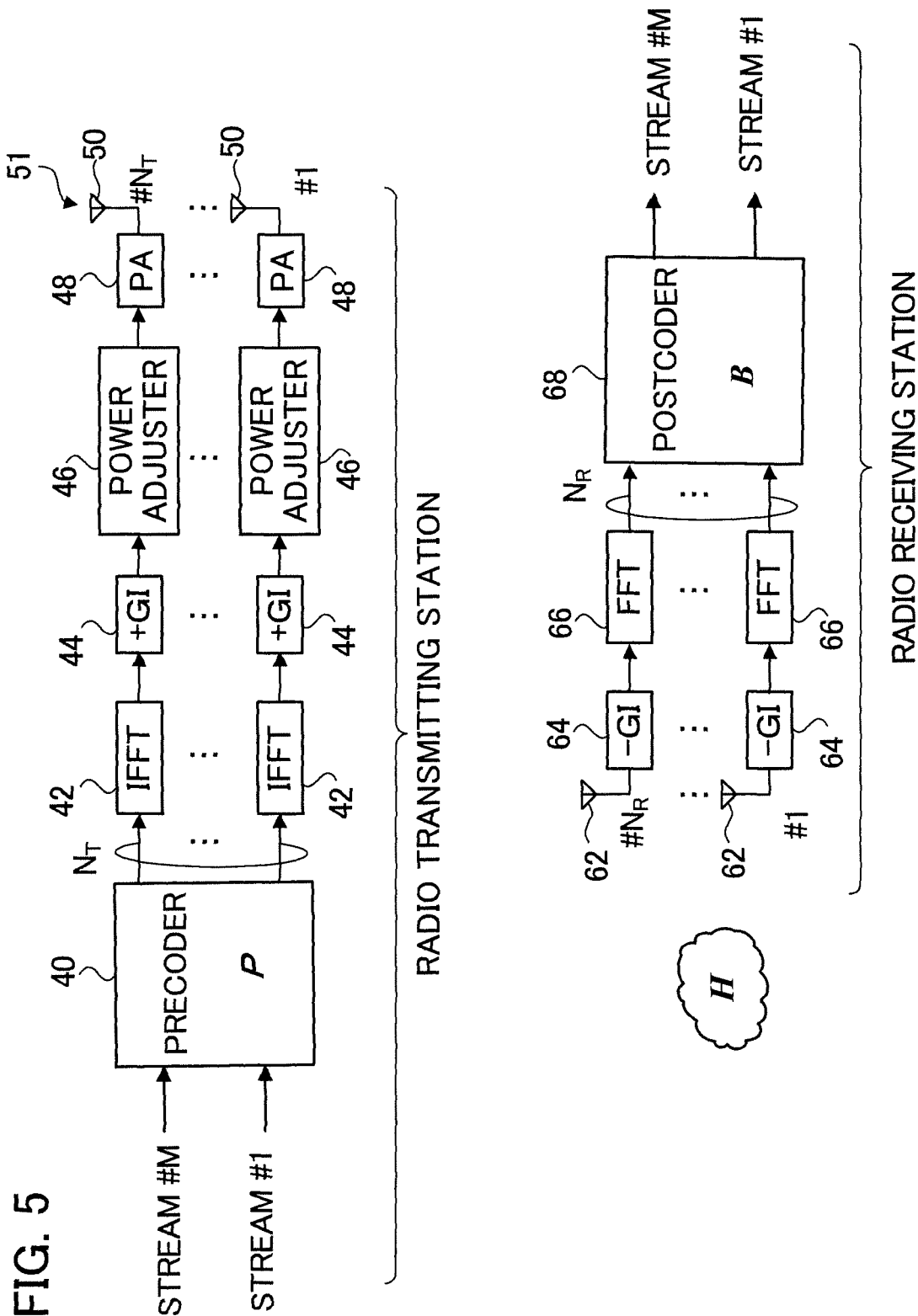
FIG. 5 is a block diagram illustrating a configuration of a radio transmitting station and that of a radio receiving station according to a first embodiment of the present invention.

FIG. 5 is a block diagram illustrating a configuration of a radio transmitting station and that of a radio receiving station according to the first embodiment of the present invention. As illustrated in FIG. 5, the radio transmitting station includes a precoder 40, $N_T$ number of inverse-fast-Fourier transformers 42, $N_T$ number of guard-interval (GI) appenders 44, $N_T$ number of power adjusters 46, $N_T$ number of power amplifiers 48, and $N_T$ number of transmitting antenna elements 50.

The transmitting antenna elements 50 constitute a massive-MIMO transmitting antenna set 51. The precoder 40 gives precoding weights to M number of data-signal streams to generate $N_T$ number of electrical signals. By giving the precoding weights to the electrical signals in this way, the direction of a beam of radio waves (a radio-wave beam) emitted from the transmitting antenna elements 50 is controlled. The $N_T$ number of electrical signals are inverse-fast-Fourier-transformed by the inverse-fast-Fourier transformers 42. The GI appenders 44 then append guard intervals to the transformed electrical signals. The resultant electrical signals are supplied to the power adjusters 46.

The power adjusters 46 adjust the powers of electrical signals that are to be supplied to at least a portion of the $N_T$ transmitting antenna elements 50 (i.e., adjust the powers of electrical signals that are to be supplied to the corresponding power amplifiers 48) such that the differences between the powers of electrical signals that are to be supplied to the $N_T$ transmitting antenna elements 50 (difference between the powers of electrical signals that are to be supplied to the $N_T$ power amplifiers 48) are reduced. Although $N_T$ number of power adjusters 46 are illustrated in FIG. 5, the power adjusters 46 may be provided in the same number as the number of electrical signals of which the powers are to be adjusted. The power amplifiers 48 each amplify an electrical signal by a constant amplification factor. Each of these power amplifiers 48 has the same capability as the other power amplifiers 48.

The precoder 40 may be of a full digital type or may be of a hybrid type. The precoder 40 of the full digital type has, for each of all the transmitting antenna elements 50, digital circuitry for precoding. The precoder 40 of the hybrid type has digital circuitry and an analog phase-rotation element. The precoder 40 of the hybrid type roughly controls the direction of the beam with the phase-rotation element and finely controls the direction of the beam with the digital circuitry.

The radio waves emitted from the transmitting antenna elements 50 of the radio transmitting station pass through a propagation path indicated by H, and they are received by receiving antenna elements 62 of the radio receiving station.

The radio receiving station includes $N_R$ number of receiving antenna elements 62, $N_R$ number of guard-interval (GI) eliminators 64, $N_R$ number of fast-Fourier transformers 66, and a postcoder 68.

The guard-interval (GI) eliminators 64 eliminate guard intervals in electrical signals that are derived from the radio waves received by the receiving antenna elements 62. The electrical signals are then fast-Fourier-transformed by the fast-Fourier transformers 66, and are supplied to the postcoder 68. The postcoder 68 applies a postcoding matrix to the $N_R$ electrical signals to reproduce the M number of data-signal streams.

The received signal vector y at each subcarrier, after having undergone the postcoding, can be expressed by the following equation (1).

$$y=BHPs+Bn \quad (1)$$

In the equation (1), B is an $M \times N_T$ precoding matrix, H is an $N_R \times N_T$ channel matrix, P is an $N_R \times M$ postcoding matrix, s is a transmission signal vector, and n is a noise vector derived from thermal noise in the radio receiving station.

The radio receiving station reproduces the M data-signal streams with a publicly known method that uses the equation (1).

Non-limiting examples of the algorithm (precoding algorithm) used in the precoder 40 in the radio transmitting station to apply the precoding matrix include: eigenmode precoding, zero forcing (ZF), a method in which the Hermitian transpose of the channel matrix is used as the precoding matrix, and nonlinear beamforming. Since these algorithms are publicly known, detailed description thereof are not given.

Figure 6:
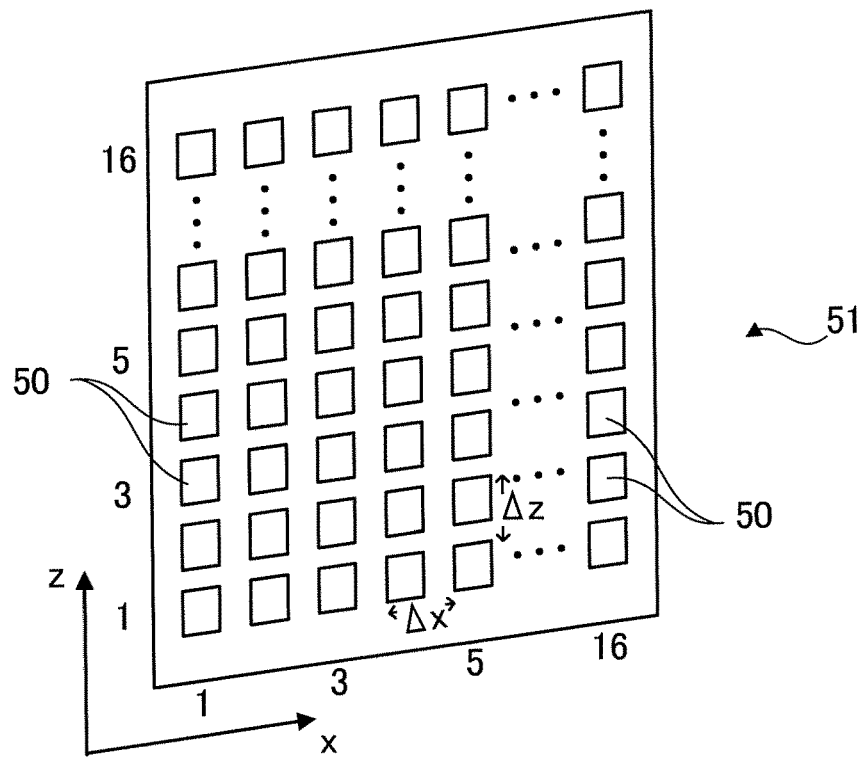
FIG. 6 is a perspective diagram illustrating a transmitting antenna set for massive MIMO in the radio transmitting station according to the first embodiment.

FIG. 6 is a perspective diagram illustrating the massive-MIMO transmitting antenna set 51 in the radio transmitting station according to this embodiment. As illustrated in FIG. 6, this transmitting antenna set 51 includes 256 transmitting antenna elements 50 regularly arranged on a flat square, with 16 elements arrayed in the horizontal direction (x direction) and 16 elements arrayed in the vertical direction (y direction). An interval Δx between any two antenna elements 50 in the horizontal direction is a half of the wavelength to be used, and an interval Δz between any two antenna elements 50 in the vertical direction is also a half of the wavelength to be used.

Since the radio transmitting station performs precoding in MIMO, as well as in massive MIMO, for transmitting multiple streams, the powers of electrical signals that are to be supplied to certain ones of the multiple transmitting antenna elements are much greater than the powers of electrical signals that are to be supplied to the other ones of the multiple transmitting antenna elements. As a result of the precoding being performed, the power of an electrical signal to be supplied to each transmitting antenna element is considered to depend on the arrangement of all the transmitting antenna elements, the precoding algorithm in use, the position of that transmitting antenna element, and the beam transmission direction.

Figure 7:
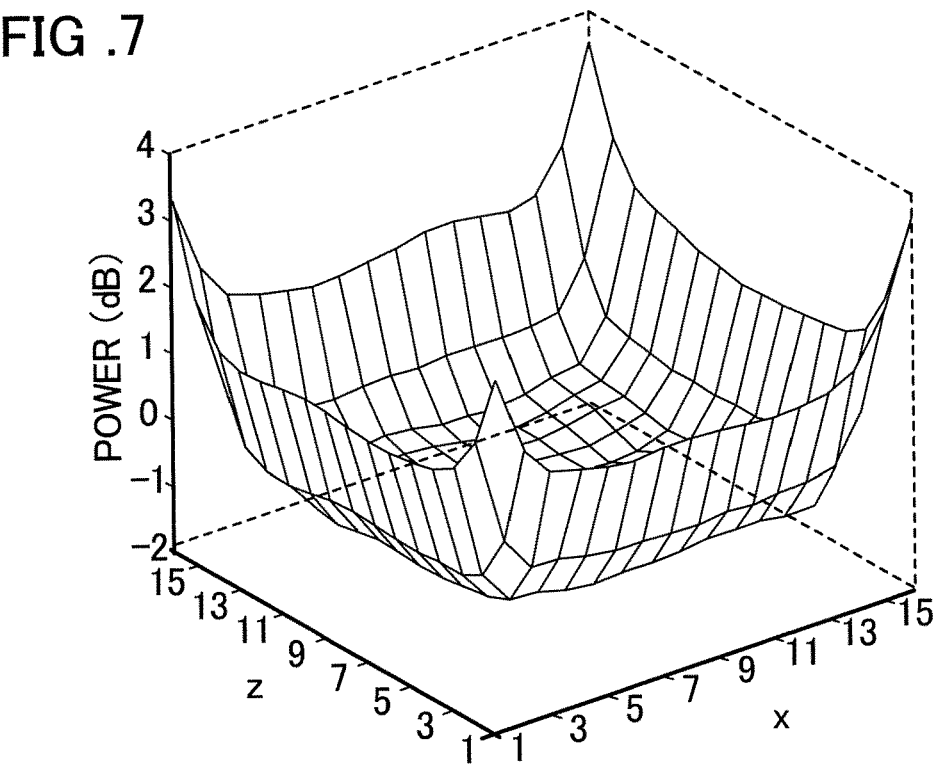
FIG. 7 is a graph showing results of a simulation in which a distribution is investigated of transmission powers in a case where a radio transmitting station not having a power adjuster emits radio waves with eigenmode precoding.

FIG. 7 is a graph showing results of a simulation in which a distribution is investigated of transmission powers in a case where a radio transmitting station not having the power adjusters 46 emits radio waves with eigenmode precoding. In the simulation, it is assumed that the transmitting antenna set illustrated in FIG. 6 emits 16 streams at an angle of 90 degrees with respect to the plane formed by the transmitting antenna set, and a propagation path having the fading of the Nakagami-Rice distribution (K=10 dB, where K is the Rician factor) is assumed. Under these assumptions, a time-average value of the power of an electrical signal to be supplied to each transmitting antenna element 50 has been calculated.

As is clear from FIG. 7, the powers at transmitting antenna elements 50 arranged in a center portion of the transmitting antenna set are low, whereas the powers at transmitting antenna elements 50 arranged in edge portions of the transmitting antenna set are conspicuously high. In particular, the powers at transmitting antenna elements 50 that are arranged at the four corners of the transmitting antenna set are extremely high.

Figure 8:
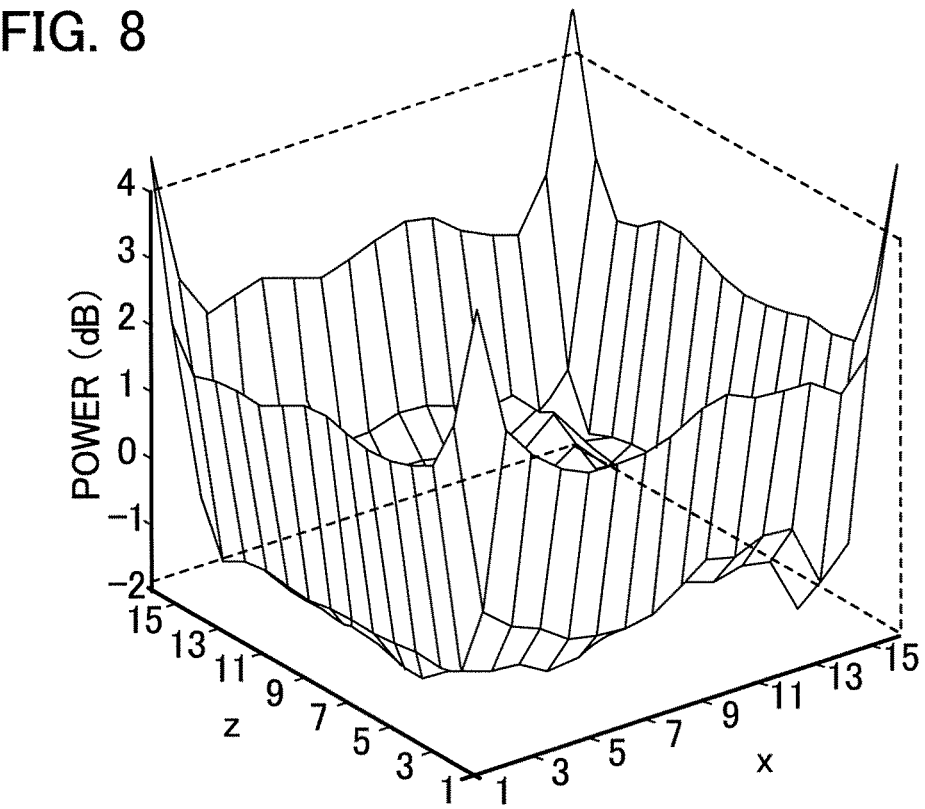
FIG. 8 is a graph showing results of a simulation in which a distribution is investigated of transmission powers in a case where the radio transmitting station not having a power adjuster emits radio waves with zero forcing.

FIG. 8 is a graph showing results of a simulation in which a distribution is investigated of transmission powers in a case where a radio transmitting station not having the power adjusters 46 emits radio waves with zero forcing. In the simulation, it is assumed that the transmitting antenna set illustrated in FIG. 6 emits 16 streams at an angle of 90 degrees with respect to the plane formed by the transmitting antenna set, and a propagation path having the fading of the Nakagami-Rice distribution (K=10 dB) is assumed. Under these assumptions, a time-average value of the power of an electrical signal to be supplied to each transmitting antenna element 50 has been calculated.

As is clear from FIG. 8, the powers at transmitting antenna elements 50 arranged in a center portion of the transmitting antenna set are low, whereas the powers at transmitting antenna elements 50 arranged in edge portions of the transmitting antenna set are conspicuously high. In particular, the powers at transmitting antenna elements 50 that are arranged at the four corners of the transmitting antenna set are extremely high. With zero forcing, compared with eigenmode precoding, the powers in the edge portions are higher and the dynamic range further increases.

Figure 9:
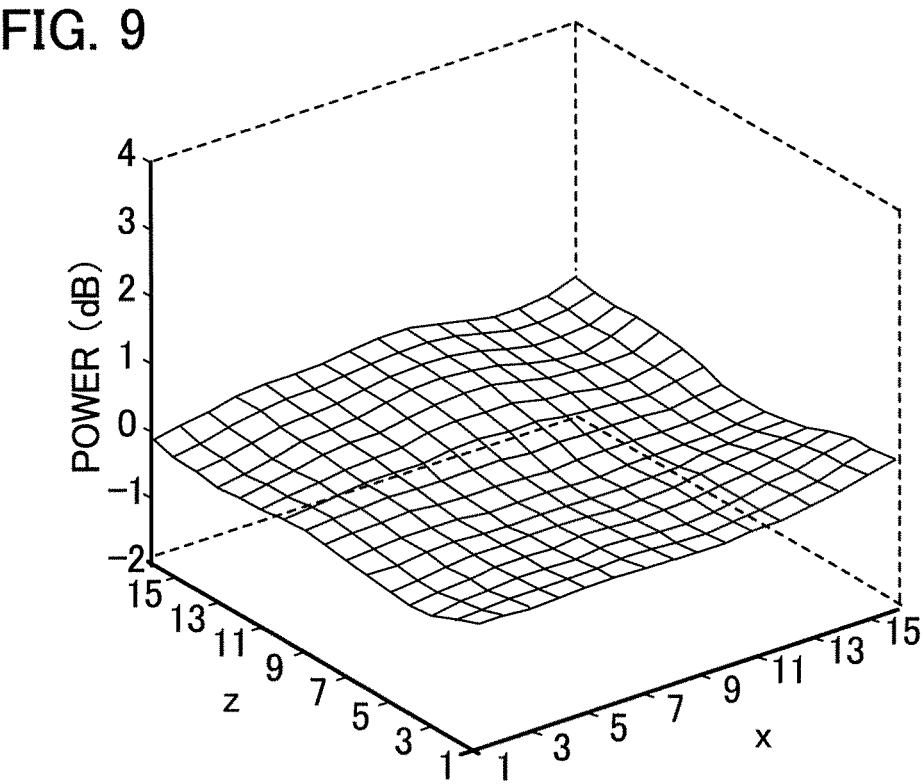
FIG. 9 is a graph showing results of a simulation in which a distribution is investigated of transmission powers in a case where the radio transmitting station not having a power adjuster emits radio waves in accordance with a precoding algorithm that uses as a precoding matrix the Hermitian transpose of a channel matrix.

FIG. 9 is a graph showing results of a simulation in which a distribution is investigated of transmission powers in a case where a radio transmitting station not having the power adjusters 46 emits radio waves in accordance with a precoding algorithm that uses, as the precoding matrix, the Hermitian transpose of a channel matrix. In the simulation, it is assumed that the transmitting antenna set illustrated in FIG. 6 emits 16 streams at an angle of 90 degrees with respect to the plane formed by the transmitting antenna set, and a propagation path having the fading of the Nakagami-Rice distribution (K=10 dB) is assumed. Under these assumptions, a time-average value of the power of an electrical signal to be supplied to each transmitting antenna element 50 has been calculated. It is noted that, according to this precoding algorithm, the angle of the streams is limited to 90 degrees. As is clear from FIG. 9, in this case, the power distribution is considerably flat and has a small dynamic range.

From the simulation results shown in FIGS. 7 to 9, it is understood that, in a case where the power adjusters 46 reducing the differences between the powers of electrical signals to be supplied to the transmitting antenna elements 50 are provided, it is preferable that the powers be adjusted in the following manners.

Figure 10:
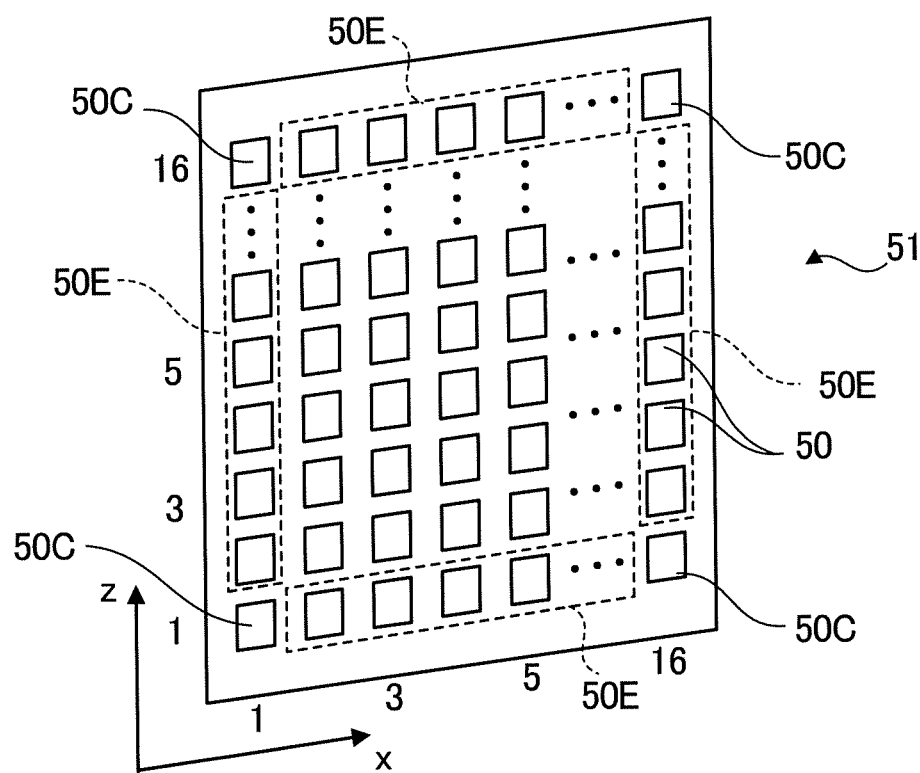
FIG. 10 is a diagram illustrating power adjustment according to the first embodiment.

In a case where eigenmode precoding or zero forcing is used in the radio transmitting station, the powers of electrical signals to be supplied to the transmitting antenna elements 50 arranged in the edge portions of the transmitting antenna set 51 should be attenuated. In particular, the powers of electrical signals to be supplied to the transmitting antenna elements 50 arranged in the four corners of the transmitting antenna set 51 (the transmitting antenna elements 50C in FIG. 10) should be attenuated more than the powers of electrical signals to be supplied to the transmitting antenna elements 50 arranged in the edge portions other than in the four corners (the transmitting antenna elements 50E in FIG. 10) should be. Although FIG. 10 illustrates the transmitting antenna elements 50E being arranged in a single line in each of the four edge portions of the transmitting antenna set 51, the transmitting antenna elements 50E may be arranged in two lines.

Alternatively or additionally, in a case where eigenmode precoding or zero forcing is used in the radio transmitting station, the powers of electrical signals to be supplied to the transmitting antenna elements 50 arranged in the center portion of the transmitting antenna set 51 should be increased.

Whether to perform the power adjustment should be determined according to the precoding algorithm used in the radio transmitting station.

The degree of the power adjustment should be determined according to the precoding algorithm used in the radio transmitting station.

In a case where the radio transmitting station uses only a single precoding algorithm, the degree of the power adjustment may be fixed.

In a case where the radio transmitting station uses only the precoding algorithm that uses, as the precoding matrix, the Hermitian transpose of a channel matrix, the power adjustment may not need to be performed. Here, the power adjustment may still be performed in this case.

Details of the means to perform the power adjustment are described later. Additionally, the conventional PAPR reduction methods in OFDM may also be used. In this case, as parameters that are used in PAPR reduction, information on the precoding algorithm or that on the antenna elements may be used.

The simplest configuration of each power adjuster 46 illustrated in FIG. 5 would be an attenuator having a fixed attenuation factor or an amplifier having a fixed amplification factor. In a case where only a single precoding algorithm (e.g., eigenmode precoding or zero forcing) is used in the radio transmitting station, the attenuation factor or the amplification factor may be fixed. That is, it is sufficient for the power adjusters 46 to adjust, by preset amounts of adjustment, the powers of the electrical signals to be supplied to the transmitting antenna elements 50 (the powers of the electrical signals to be supplied to the power amplifiers 48). It is possible to select, for the precoding algorithm in use, the attenuation factors or the amplification factors, i.e., the amounts of adjustment, such that the differences between the powers of the electrical signals to be supplied to the multiple transmitting antenna elements 50 are reduced (and preferably such that the time-average values of the powers are homogeneous).

The powers of the electrical signals that are to be supplied to the transmitting antenna elements 50 arranged in the edge portions of the transmitting antenna set 51 other than in the four corners (the transmitting antenna elements 50E in FIG. 10) are attenuated, i.e., reduced, by the corresponding power adjusters 46 serving as attenuators. The powers of the electrical signals that are to be supplied to the transmitting antenna elements 50 arranged in the four corners of the transmitting antenna set 51 (the transmitting antenna elements 50C in FIG. 10) are also attenuated by the corresponding power adjusters 46 serving as attenuators. It is preferable that the amounts of attenuation for the transmitting antenna elements 50C be greater than the amounts of attenuation for the transmitting antenna elements 50E. The powers of the electrical signals that are to be supplied to the other transmitting antenna elements 50 (i.e., the transmitting antenna elements 50 arranged in the center portions of the transmitting antenna set 51) are amplified, i.e., increased, by the corresponding power adjusters 46 serving as amplifiers.

By simulation or experiment, the power (e.g., a time-average of the power) of an electrical signal to be supplied to each transmitting antenna element 50 may be investigated for a radio transmitting station that does not have power adjusters 46, and on the basis of the investigation result, the attenuation factors or the amplification factors, i.e., the amounts of adjustment, in the power adjusters 46, may be selected. For example, an attenuation factor may be the reciprocal of a corresponding power.

In a case where a power adjuster 46 is provided for each of the electrical signals to be supplied to all the transmitting antenna elements 50 in the transmitting antenna set 51 (for each of the powers of the electrical signals to be supplied to all the power amplifiers 48), it is possible to easily homogenize the time-average values of the powers of the electrical signals to be supplied to all the transmitting antenna elements 50 in the transmitting antenna set 51 (the powers of the electrical signals to be supplied to all the power amplifiers 48). In addition, since the reduction in the powers in the edge portions including the four corners of the transmitting antenna set 51 leaves a margin in the power that can be used for the entire radio transmitting station, it is possible to increase overall the powers of electrical signals that are to be supplied to all the transmitting antenna elements 50 in the transmitting antenna set 51.

However, the provision of a great number of power adjusters 46 increases the scale of circuitry and also increases the power consumption. In view of this, only the power adjusters 46 serving as attenuators may be provided, and only the powers of the electrical signals to be supplied to the transmitting antenna elements 50 arranged in the edge portions of the transmitting antenna set 51 may be adjusted. Alternatively, only the power adjusters 46 serving as amplifiers may be provided, and only the powers of the electrical signals to be supplied to the transmitting antenna elements 50 arranged in the center portion of the transmitting antenna set 51 may be adjusted.

As described above, in this embodiment, the differences between the powers of the electrical signals to be supplied to the multiple transmitting antenna elements are reduced. Therefore, even in a case where the powers of the electrical signals to be supplied to the transmitting antenna elements are amplified by the power amplifiers 48, the nonlinear distortion of the signals output from the power amplifiers 48 can be reduced.

Figure 11:
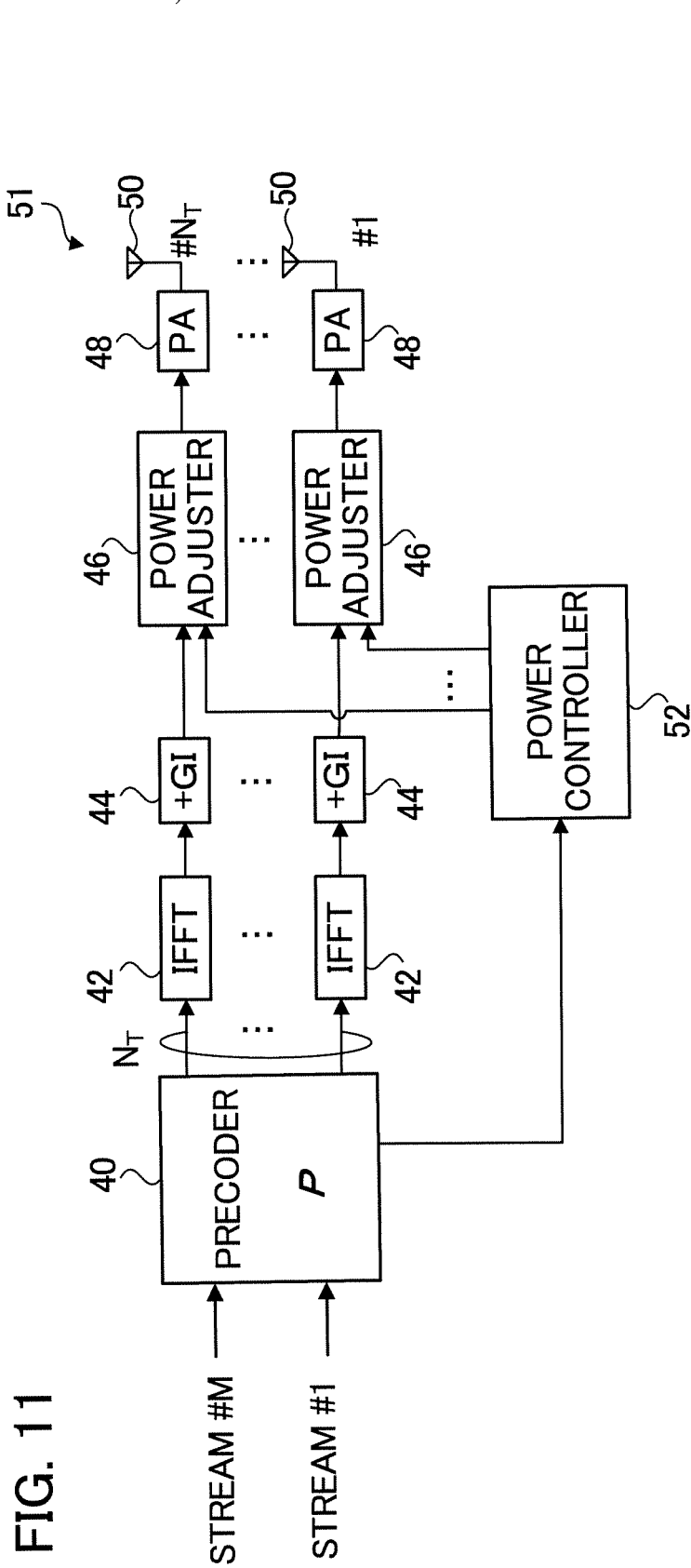
FIG. 11 is a block diagram illustrating a modification of the radio transmitting station according to the first embodiment.

FIG. 11 shows a modification of the radio transmitting station according to the first embodiment. In this modification, the precoder 40 gives precoding weights to the electrical signals to be supplied to the transmitting antenna elements 50 using a precoding algorithm that is selected from precoding algorithms (e.g., eigenmode precoding and zero forcing) differing from one another. The power adjusters 46 are each an attenuator having a variable attenuation factor or an amplifier having a variable amplification factor. This radio transmitting station has a power controller 52. The power controller 52 adjusts the amounts of adjustment in the power adjusters 46 (the attenuation factors when the power adjusters 46 serving as attenuators, or the amplification factors when the power adjusters 46 serving as amplifiers) according to the precoding algorithm used by the precoder 40. In other words, the power adjusters 46 change the amounts of power adjustment according to the precoding algorithm used by the precoder 40. The power controller 52 may be a CPU (central processing unit) that operates in accordance with a computer program. Also in this modification, the power adjusters 46 may be provided for at least a portion of the transmitting antenna elements 50 for which powers are to be adjusted, or may be provided for all the transmitting antenna elements 50 to adjust the powers of the electrical signals to be supplied to all the transmitting antenna elements 50.

By simulation or experiment using each precoding algorithm, the power (e.g., a time-average of the power) of an electrical signal to be supplied to each transmitting antenna element 50 may be investigated for the radio transmitting station having no power adjusters 46, and on the basis of the investigation result, the attenuation factors or the amplification factors, i.e., the amounts of adjustment, in the power adjusters 46, may be selected. For example, an attenuation factor may be the reciprocal of a corresponding power.

In this modification, in addition to the effects of the aforementioned embodiment, the amounts of power adjustment can be appropriately changed according to the precoding algorithm used in the precoder 40 in a case where the radio transmitting station can use multiple precoding algorithms.

Second Embodiment

Figure 12:
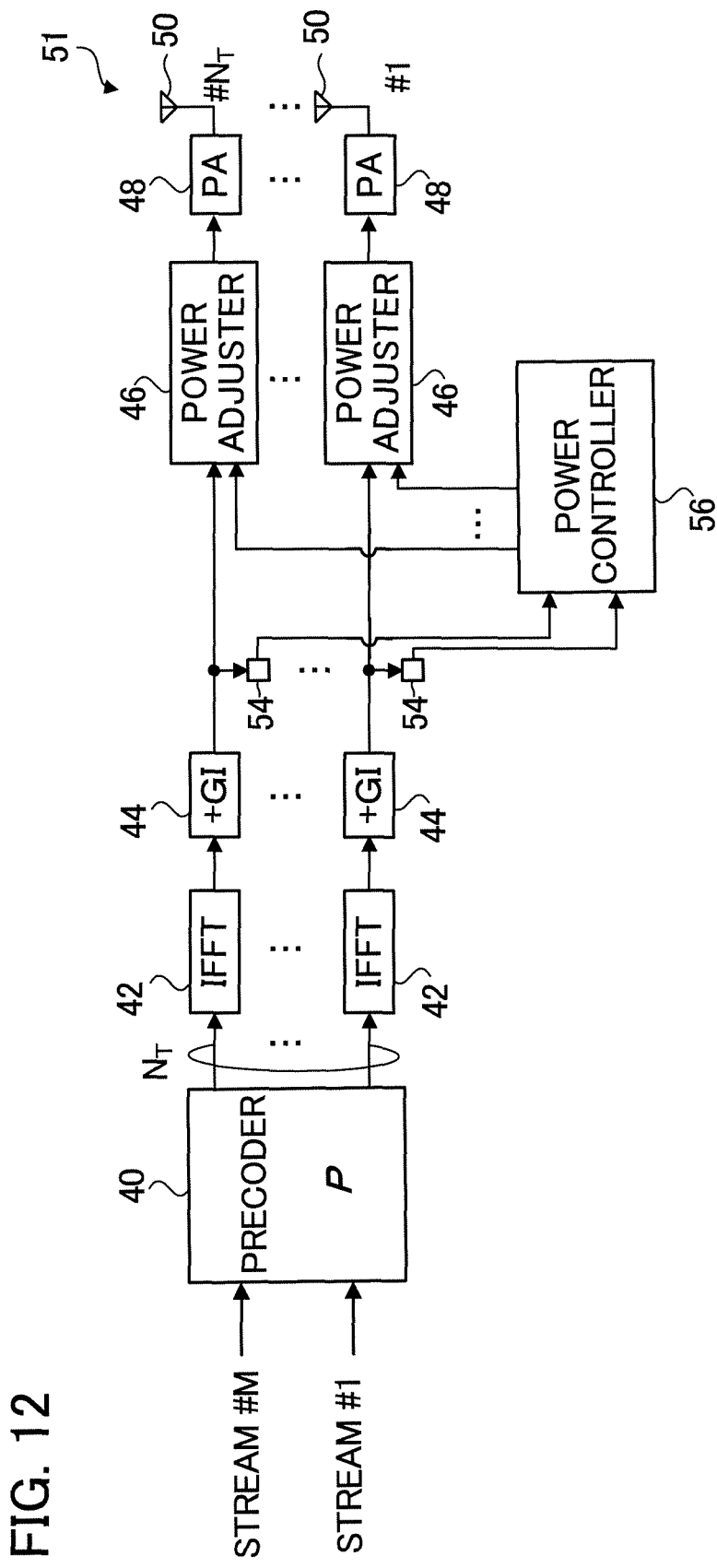
FIG. 12 is a block diagram illustrating a radio transmitting station according to a second embodiment of the present invention.

FIG. 12 shows a radio transmitting station according to a second embodiment of the present invention. In FIG. 12, the reference signs same as those in FIG. 5 are used for denoting common elements, and detailed description thereof are not given.

The radio transmitting station according to the second embodiment has multiple measurers 54 and a power controller 56. The measurers 54 measure the powers of electrical signals that are to be supplied to at least a portion of the transmitting antenna elements 50. The measurers 54 may be provided for at least a portion of the transmitting antenna elements 50 for which powers are to be adjusted, or may be provided for all the transmitting antenna elements 50 to measure the powers of electrical signals to be supplied to all the transmitting antenna elements 50.

The power adjusters 46 are each an attenuator having a variable attenuation factor or an amplifier having a variable amplification factor. Similarly to the first embodiment, the power adjusters 46 may be provided for at least a portion of the transmitting antenna elements 50 for which powers are to be adjusted, or may be provided for all the transmitting antenna elements 50 to adjust the powers of electrical signals to be supplied to all the transmitting antenna elements 50.

The power controller 56 may be a CPU that operates in accordance with a computer program. The power controller 56 calculates the time-averaged or the normalized value of the power of an electrical signal to be supplied to each of the transmitting antenna elements 50 on the basis of the result of measurement by the power controller 56, and adjusts the amounts of adjustment in the power adjusters 46 (the attenuation factors when the power adjusters 46 serving as attenuators, or the amplification factors when the power adjuster 46 serving as amplifiers) according to the calculated time-averaged powers or the calculated normalized powers. In other words, the power adjusters 46 change the amounts of power adjustment on the basis of the powers measured by the measurers 54 (more specifically, according to the time-averaged powers or the normalized powers). For example, an attenuation factor may be the reciprocal of a corresponding time-averaged power or a corresponding normalized power. In this case, the power adjusters 46 each multiply the power of an electrical signal to be supplied to the corresponding transmitting antenna element by the reciprocal of the time-averaged power or the normalized power.

Figure 13:
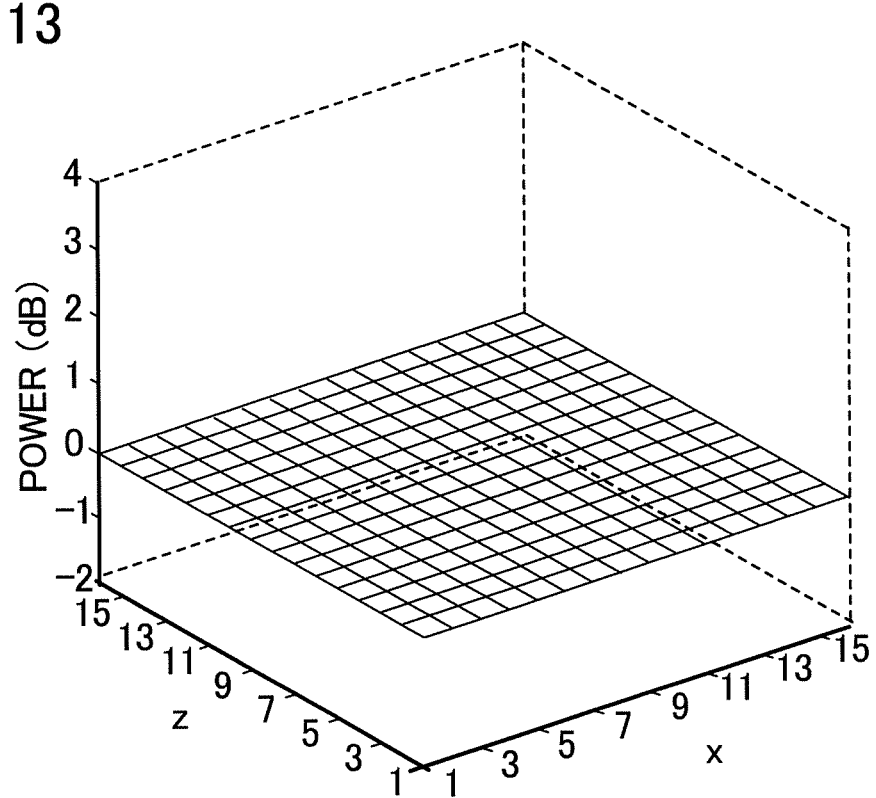
FIG. 13 is a graph showing results of a simulation in which a distribution is investigated of transmission powers in a case where the radio transmitting station according to the second embodiment emits radio waves.

FIG. 13 is graph showing results of a simulation in which a distribution is investigated of transmission powers in a case where the radio transmitting station according to the second embodiment emits radio waves. In the simulation, it is assumed that the transmitting antenna set illustrated in FIG. 6 emits 16 streams at an angle of 90 degrees with respect to the plane formed by the transmitting antenna set, and a propagation path having the fading of the Nakagami-Rice distribution (K=10 dB) is assumed. Under these assumptions, a time-average value of the power of an electrical signal to be supplied to each transmitting antenna element 50 has been calculated. In this simulation, each of the powers of electrical signals to be supplied to all the transmitting antenna elements 50 in the transmitting antenna set 51 (each of the powers of the electrical signals to be supplied to all the power amplifiers 48) has been multiplied by the reciprocal of the time-averaged power or the normalized power for that power. In the simulation, the power distribution is investigated with each of eigenmode precoding, zero forcing, and the precoding algorithm that uses as a precoding matrix the Hermitian transpose of a channel matrix, and the same results as illustrated in FIG. 13 have been obtained. As is clear from FIG. 13, the power distribution is flat, and homogeneous time-average values of powers are attained.

As described above, in this embodiment, the differences between the powers of the electrical signals that are to be supplied to the multiple transmitting antenna elements are reduced. Therefore, even in a case where the powers of the electrical signals to be supplied to the transmitting antenna elements are amplified by the power amplifiers 48, the nonlinear distortion of the signals output from the power amplifiers 48 can be reduced. In addition, since the power adjusters 46, on the basis of the powers measured by the measurers 54, adjust the powers of the electrical signals to be supplied to at least a portion of the transmitting antenna elements 50, the amounts of power adjustment can be appropriately changed according to the actual powers. Furthermore, in a case where the radio transmitting station can use multiple precoding algorithms, the amounts of power adjustment can be appropriately changed according to the precoding algorithm that is used in the precoder 40.

Third Embodiment

Figure 14:
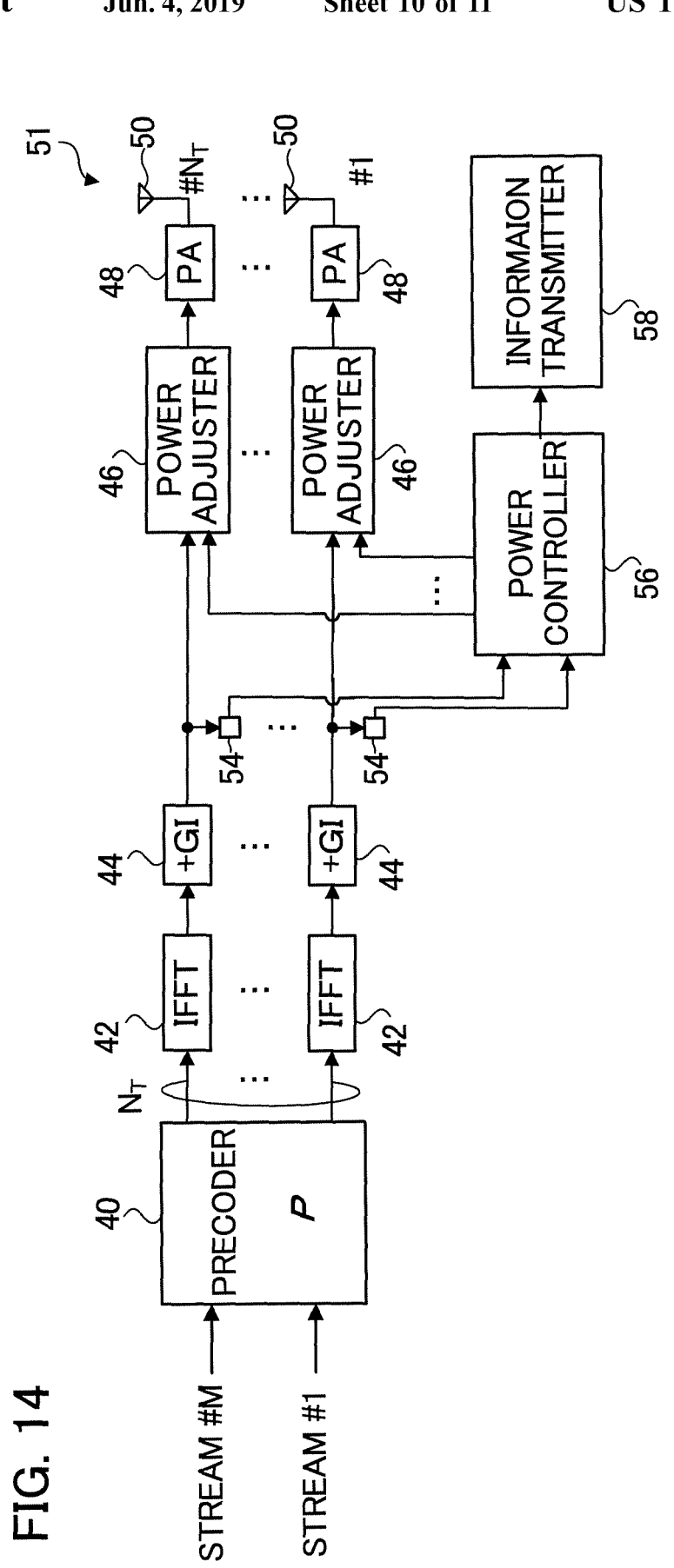
FIG. 14 is a block diagram illustrating a radio transmitting station according to a third embodiment of the present invention.

FIG. 14 shows a radio transmitting station according to the third embodiment of the present invention. In FIG. 14, reference signs same as those in FIG. 12 are used for denoting common elements, and detailed description thereof are not given. The radio transmitting station according to the third embodiment includes an information transmitter 58. The information transmitter 58 may be a CPU.

The information transmitter 58 generates information that indicates a result of the power adjustment in the power adjusters 46 by the power controller 56, and transmits this information to the radio receiving station. The information may be transmitted in the form of control information that directly indicates the information. Alternatively, without the information transmitter 58 being separately provided, the power adjustment performed in the power adjusters 46 may also be performed on a reference signal, and the radio receiving station may estimate a result of the power adjustment. In other words, the radio receiving station may be informed of the result of the power adjustment in an indirect manner.

In a case where the power adjusters 46 adjust the powers of electrical signals that are to be supplied to at least a portion of the transmitting antenna elements 50 as described above, the direction of an actual beam that is formed by the transmitting antenna set 51 is different from the beam-direction that will otherwise be induced by the precoding matrix in the precoder 40. By the radio transmitting station informing the radio receiving station of the result of the power adjustment in the power adjusters 46, the radio receiving station will be able to perform reception processing that is adapted for the actual beam by an operation such as correction of a postcoding matrix in the postcoder 68. Although the third embodiment is a modification of the second embodiment, the above-described modification may be applied to the first embodiment or the modification of the first embodiment.

Other Modifications

Although the embodiments of the present invention are described above using massive MIMO as an example, the present invention is not limited to massive MIMO, and it can be applied to other MIMOs. The number of the transmitting antenna elements in the transmitting antenna set is not limited to 256, and may be 9, for example. The transmitting antenna set is not limited to the square-shaped array, and may be a round-shaped array or an array of any other shape.

Figure 15:
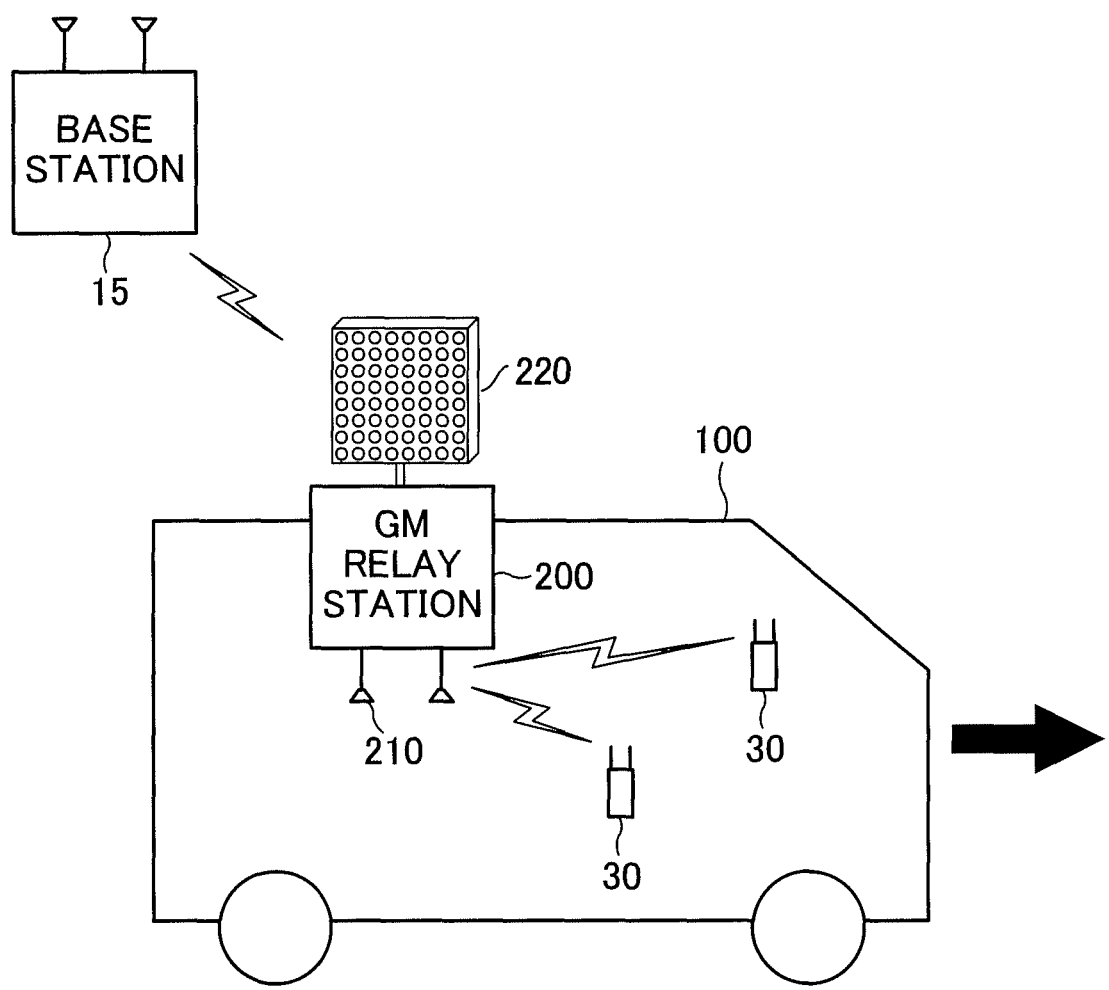
FIG. 15 is a diagram illustrating usage of a group-mobility relay station that can serve as the radio transmitting station according to the present invention.

Although the small cell base station 20 is the radio transmitting station and the user device 30 is the radio receiving station in the above embodiments, the radio transmitting station may be a GM (group-mobility) relay station and the radio receiving station may be a base station 15. FIG. 15 shows a usage of the GM relay station. The GM relay station 200 is fixedly mounted on a mobile vehicle 100, and has a massive-MIMO antenna set 220. The GM relay station 200 communicates with a base station 15 and uses massive MIMO for uplink communication at least to the base station 15. The base station 15 may be the macro cell base station 10 or may be the small cell base station 20. The GM relay station 200 communicates with the transceiving antennas 210 that are for communication with user devices 30. The GM relay station 200 relays communication between the base station 15 and the user devices 30 inside the vehicle 100. In other words, the GM relay station 200 receives via the antenna set 220 a downlink signal that is addressed to any of the user devices 30 in the vehicle 100 and is transmitted from the base station 15, and transmits the downlink signal addressed to that user device 30 via the transceiving antennas 210. The GM relay station 200 also receives via the transceiving antennas 210 an uplink signal that is transmitted from any of the user devices 30 in the vehicle 100, and transmits a beam of the uplink signal in the direction of the base station 15 via the antenna set 220. Although a good example of the vehicle 100 is any vehicle for public transportation that can accommodate multiple and unspecified users, such as a bus, a train, or a streetcar, the vehicle 100 may be a vehicle for personal use, such as a private car. As described above, since the relay station 200 relays signals for a group composed of multiple user devices 30 that moves with the relay station 200, the relay station 200 is referred to as the GM (group-mobility) relay station.

Although the power adjusters 46 are arranged in a stage preceding the power amplifiers 48 in the above embodiments, the present invention is not limited to these embodiments. The power adjusters 46 may be arranged in freely chosen positions as long as the powers of electrical signals that are to be supplied to the power amplifiers 48 can be adjusted.

DESCRIPTION OF REFERENCE SIGNS

2 . . . base station; 10 . . . macro cell base station; 12 . . . central control station; 15 . . . base station (radio receiving station); 20 . . . small cell base station (radio transmitting station); 30 . . . user device (radio receiving station); 40 . . . precoder; 42 . . . inverse-fast-Fourier transformer; 44 . . . guard-interval (GI) appender; 46 . . . power adjuster; 48 . . . power amplifier; 50 . . . transmitting antenna element; 51 . . . transmitting antenna set; 52 . . . power controller; 54 . . . measurer; 56 . . . power controller; 58 . . . information transmitter; 62 . . . receiving antenna element; 64 . . . guard-interval (GI) eliminator; 66 . . . fast-Fourier transformer; 68 . . . postcoder; 100 . . . vehicle; 200 . . . GM relay station (radio transmitting station); 210 . . . transceiving antenna; 220 . . . antenna set.

The invention claimed is:

1. A radio transmitting station comprising:
multiple transmitting antennas that transform electrical signals into radio waves and emit the radio waves;
a processor that controls a beam direction of the radio waves to be emitted from the multiple transmitting antennas by giving precoding weights to the electrical signals to be supplied to the multiple transmitting antennas; and
at least one power adjuster that adjusts power of an electrical signal that is to be supplied to at least a portion of the multiple transmitting antennas, such that differences between powers of the electrical signals to be supplied to the multiple transmitting antennas are reduced,
wherein the processor gives the precoding weights to the electrical signals to be supplied to the multiple transmitting antennas using a precoding algorithm that is selected from precoding algorithms differing from one another, and wherein the power adjuster changes an amount of power adjustment according to the precoding algorithm used in the processor.

2. The radio transmitting station according to claim 1, wherein the power adjuster reduces power of an electrical signal that is to be supplied to a transmitting antenna that is arranged in an edge portion among the arrayed multiple transmitting antennas.

3. The radio transmitting station according to claim 2, wherein the power adjuster increases power of an electrical signal that is to be supplied to a transmitting antenna that is arranged in a center portion among the arrayed multiple transmitting antennas.

4. The radio transmitting station according to claim 2, wherein the power adjuster adjusts, by a preset amount of adjustment, the power of the electrical signal to be supplied to the at least a portion of the multiple transmitting antennas.

5. The radio transmitting station according to claim 2, further comprising a measurer that measures the power of the electrical signal to be supplied to the at least a portion of the multiple transmitting antennas,
wherein the power adjuster, on the basis of the power measured by the measurer, adjusts the power of the electrical signal to be supplied to the at least a portion of the multiple transmitting antennas.

6. The radio transmitting station according to claim 5, wherein the power adjuster multiplies the power of the electrical signal to be supplied to the at least a portion of the multiple transmitting antennas by a reciprocal of a time-average of, or a reciprocal of a normalized power of, the power of the electrical signal to be supplied to the at least a portion of the multiple transmitting antennas, the power having been measured by the measurer.

7. The radio transmitting station according to claim 2, further configured to inform a radio receiving station of a result of power adjustment performed by the power adjuster.

8. The radio transmitting station according to claim 1, wherein the power adjuster increases power of an electrical signal that is to be supplied to a transmitting antenna that is arranged in a center portion among the arrayed multiple transmitting antennas.

9. The radio transmitting station according to claim 8, wherein the power adjuster adjusts, by a preset amount of adjustment, the power of the electrical signal to be supplied to the at least a portion of the multiple transmitting antennas.

10. The radio transmitting station according to claim 8, further comprising a measurer that measures the power of the electrical signal to be supplied to the at least a portion of the multiple transmitting antennas,
wherein the power adjuster, on the basis of the power measured by the measurer, adjusts the power of the electrical signal to be supplied to the at least a portion of the multiple transmitting antennas.

11. The radio transmitting station according to claim 10, wherein the power adjuster multiplies the power of the electrical signal to be supplied to the at least a portion of the multiple transmitting antennas by a reciprocal of a time-average of, or a reciprocal of a normalized power of, the power of the electrical signal to be supplied to the at least a portion of the multiple transmitting antennas, the power having been measured by the measurer.

12. The radio transmitting station according to claim 8, further configured to inform a radio receiving station of a result of power adjustment performed by the power adjuster.

13. The radio transmitting station according to claim 1, wherein the power adjuster adjusts, by a preset amount of adjustment, the power of the electrical signal to be supplied to the at least a portion of the multiple transmitting antennas.

14. The radio transmitting station according to claim 13, further configured to inform a radio receiving station of a result of power adjustment performed by the power adjuster.

15. The radio transmitting station according to claim 1, further comprising a measurer that measures the power of the electrical signal to be supplied to the at least a portion of the multiple transmitting antennas,
wherein the power adjuster, on the basis of the power measured by the measurer, adjusts the power of the electrical signal to be supplied to the at least a portion of the multiple transmitting antennas.

16. The radio transmitting station according to claim 15, wherein the power adjuster multiplies the power of the electrical signal to be supplied to the at least a portion of the multiple transmitting antennas by a reciprocal of a time-average of, or a reciprocal of a normalized power of, the power of the electrical signal to be supplied to the at least a portion of the multiple transmitting antennas, the power having been measured by the measurer.

17. The radio transmitting station according to claim 16, further configured to inform a radio receiving station of a result of power adjustment performed by the power adjuster.

18. The radio transmitting station according to claim 15, further configured to inform a radio receiving station of a result of power adjustment performed by the power adjuster.

19. The radio transmitting station according to claim 1, further configured to inform a radio receiving station of a result of power adjustment performed by the power adjuster.

* * * * *